No. 787,898. PATENTED APR. 25, 1905.
L. C. CUMMINGS.
VEHICLE TIRE.
APPLICATION FILED OCT. 22, 1904.

Witnesses
Edward S. Day
Alfred H. Hildreth

Inventor
Lincoln C. Cummings
by his Attorneys
Phillips Van Everen & Fish

No. 787,898. Patented April 25, 1905.

UNITED STATES PATENT OFFICE.

LINCOLN C. CUMMINGS, OF BROOKLINE, MASSACHUSETTS.

VEHICLE-TIRE.

SPECIFICATION forming part of Letters Patent No. 787,898, dated April 25, 1905.

Application filed October 22, 1904. Serial No. 229,528.

*To all whom it may concern:*

Be it known that I, LINCOLN C. CUMMINGS, a citizen of the United States, residing at Brookline, in the county of Norfolk and State of Massachusetts, have invented certain new and useful Improvements in Vehicle-Tires; and I do hereby declare the following to be a full, clear, and exact description of the invention, such as will enable others skilled in the art to which it appertains to make and use the same.

The present invention relates to an improvement in vehicle-tires.

The object of the invention is to improve the construction of tires, and particularly pneumatic tires, in order to render them less liable to puncture and more durable in use.

To the above end the present invention consists in the tire hereinafter described, and particularly defined in the claims.

Figure 1:
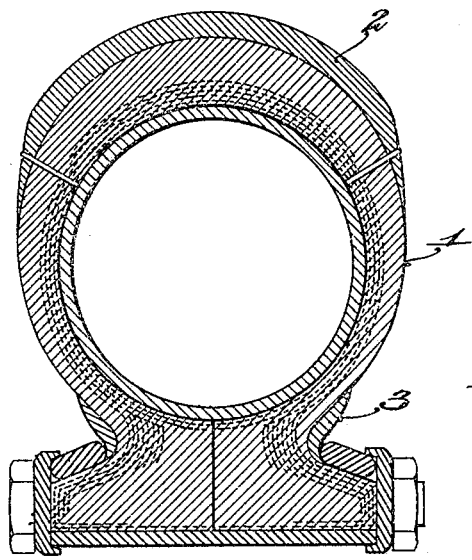
Figure 2:
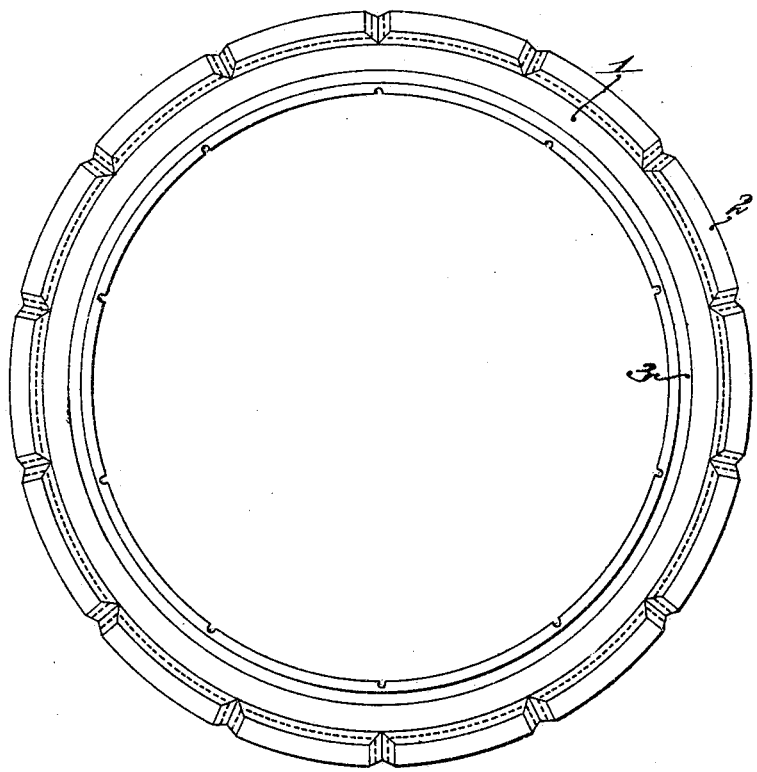

In the accompanying drawings, illustrating the preferred form of the invention, Figure 1 is the section of the shoe of a double-tube tire, and Fig. 2 is a side elevation of a similar tire embodying my invention.

The shoe 1 is the ordinary double-tube-tire shoe, preferably with the tread portion thereof made somewhat thinner than is ordinarily practiced, and it is provided upon its tread-surface with a series of separate pieces of leather 2, which are secured by any suitable cement over their entire surfaces to the tread-surface of the shoe 1. It is preferred to scarf or skive the edges of the pieces of leather and to sew each piece to the tire by a seam of stitches extending around the margin thereof close to the edge. Pieces of leather 3 are cemented in the angle of the flange and tube for the purpose of strengthening the tube at the place where it is liable to break under lateral strains and rim-cut. The invention contemplates the use of the same piece of leather extended entirely from angle to angle around the tire, or, as shown in the drawings, the angle-protecting strips may be separate from the tread-strips.

In carrying out the invention pieces of leather are subjected to any convenient process of depriving the leather of its oleaginous and fatty materials. The method which I have employed for this purpose consists in boiling the leather in gasolene. This drives out of the leather all the fatty and oleaginous materials which are in it and renders it capable of being secured by rubber cement to the rubber tire.

It is necessary in providing a tire with a protective covering of leather that the leather consist of separate pieces, because if a continuous strip of leather is employed extending around the tread of the tire it decreases the resiliency of the tire and because of the differing moduli of elasticity of the rubber and the leather, and the present invention is therefore clearly distinguished from those constructions in which a continuous piece of leather is employed. It is preferred to scarf or skive the edges of the pieces of leather, so that the edges of the leather will not separate from the tire. The seams of stitches extending around the margins of the pieces of leather also contribute to the holding of the pieces of leather to the tire.

The pieces of leather preferably do not overlap each other, and as a consequence between successive pieces of leather there is a place where the leather covering is thin and where the tire might be liable to be punctured or cut by reason of the thinness of the covering. These spaces, however, are narrow and relative to the perimeter of the wheel short, so that the liability of a puncture or cut at these places is comparatively small.

The leather covering is not, of course, an absolute preventive of puncturing or cutting; but the desideratum is to produce a construction in which the liability of puncturing or cutting is much reduced without seriously impairing the resiliency of the tire. Now tire-protectors which are thick enough to afford almost complete immunity from puncture are seriously objectionable by reason of the immoderately diminished resiliency of the tire. The present construction, therefore, balances the properties of a tire so that its liability to puncture is materially reduced without serious impairment of its resiliency.

Another feature of considerable practical importance resides in the fact that the present invention may be employed upon old tires without affecting the gear. One of the very serious objections to the heavy forms of tire-protectors in which the cover is a strong thick band extending around the periphery of the tire is that when applied to old tires it raises the gear of the machine, so as seriously to affect the driving power, whereas in the application of the present protector to old tires the gear is not appreciably affected.

Another feature of the present construction which flows from the scarfing or skiving of the edges of the pieces of leather resides in the added tractive qualities of the tire due to the depressions in the surface thereof.

What is claimed is—

1. A pneumatic vehicle-tire having an outer tube provided with a series of separate non-overlapping pieces of relatively thin leather cemented thereto and having their adjacent margins oppositely scarfed or skived to form transverse depressions in the tread-surface of the tire, said pieces of leather being further united to the outer tubes by seams of stitches sewed through and through the pieces of leather and the outer tube along the scarfed margins of the pieces of leather.

2. A pneumatic vehicle-tire comprising an outer flexible shoe or cover, having a curved tread-surface, a series of individual leather pads fashioned to fit the tread, cemented thereto, extending entirely around the same, and having skived abutting adjacent edges, and stitching extending through the skived edges of the respective pads.

3. A pneumatic vehicle-tire having on its outer tread-surface a series of abutting leather pads each having its edges skived from top to bottom, cemented to the tire and having fastenings extending through the outer edges.

In testimony whereof I affix my signature in presence of two witnesses.

LINCOLN C. CUMMINGS.

Witnesses:
HORACE VAN EVEREN,
ALFRED H. HILDRETH.